(12) United States Patent
Baumann et al.

(10) Patent No.: US 7,398,866 B2
(45) Date of Patent: Jul. 15, 2008

(54) SELF-BOOSTING FRICTION BRAKE, DEVICE FOR MEASURING THE COEFFICIENT OF FRICTION, AND METHOD FOR REGULATING A BRAKING FORCE

(75) Inventors: Dietmar Baumann, Hemmingen (DE); Juergen Hilzinger, Leonberg (DE); Dirk Hofmann, Ludwigsburg (DE); Herbert Vollert, Vaihingen/Enz (DE); Andreas Henke, Diemelstadt (DE); Frieder Keller, Ubstadt-Weiher (DE); Hanniel Schmidt, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 584 days.

(21) Appl. No.: 10/345,349

(22) Filed: Jan. 16, 2003

(65) Prior Publication Data
US 2003/0164270 A1 Sep. 4, 2003

(30) Foreign Application Priority Data
Jan. 17, 2002 (DE) .................. 102 01 555

(51) Int. Cl.
*F16D 55/08* (2006.01)
(52) U.S. Cl. .................... 188/72.7; 188/72.2
(58) Field of Classification Search .......... 188/72.2, 188/72.3, 72.7, 72.8, 72.9, 71.7, 71.9, 70 B, 188/70 R, 162, 196 R, 156
See application file for complete search history.

(56) References Cited

U.S. PATENT DOCUMENTS

| | | | | |
|---|---|---|---|---|
| 3,405,785 A | * | 10/1968 | Schmid | 188/72.2 |
| 3,430,736 A | * | 3/1969 | Long | 188/72.7 |
| 3,727,727 A | | 4/1973 | Hauth | |
| 3,869,024 A | * | 3/1975 | Hauth et al. | 188/72.5 |
| 4,289,216 A | * | 9/1981 | Shirai et al. | 188/72.2 |
| 4,543,638 A | * | 9/1985 | Scarffe | 364/513 |
| 4,784,244 A | * | 11/1988 | Carre et al. | 188/156 |
| 5,219,048 A | | 6/1993 | Shaw | |
| 5,390,986 A | | 2/1995 | Hall, III | |

(Continued)

FOREIGN PATENT DOCUMENTS

DE 195 30 12 4/1971

(Continued)

OTHER PUBLICATIONS

Leber, M: "Radbremse mit mechatronischer Kennwertregelung—Untersuchung von Betriebsverhalten und Fahreranbindungs—problematik hinsichtlich Brake-by-Wire-Systemen" VDI Verlag 1998, S. 1-51.

*Primary Examiner*—Robert A. Siconolfi
*Assistant Examiner*—Mariano Sy
(74) *Attorney, Agent, or Firm*—Ronald E. Greigg

(57) ABSTRACT

The invention relates to an electromechanical, self-boosting friction brake, in particular a disk brake. The friction brake is embodied with a wedge element for exerting contact pressure on a friction brake lining; a wedge angle ($\alpha$) is selected such that a brake parameter C* is located at or near a pole point. As a result, a high self-boosting that tends toward infinity and consequently a low actuating force are attained. To avoid blocking of the friction brake, an actuating device is embodied to block an independent motion of the wedge element, or has a regulating device for regulating a contact pressure of the friction brake lining against a brake body (brake disk).

20 Claims, 1 Drawing Sheet

U.S. PATENT DOCUMENTS

| | | | | |
|---|---|---|---|---|
| 5,775,782 | A | * | 7/1998 | Akita et al. .................... 303/10 |
| 6,012,556 | A | * | 1/2000 | Blosch et al. .............. 188/71.8 |
| 6,138,801 | A | * | 10/2000 | Shirai et al. ................. 188/157 |
| 6,142,271 | A | | 11/2000 | Bill et al. |
| 6,264,009 | B1 | * | 7/2001 | Johnson ..................... 188/72.6 |
| 6,318,513 | B1 | * | 11/2001 | Dietrich et al. ............ 188/72.7 |

FOREIGN PATENT DOCUMENTS

| | | |
|---|---|---|
| DE | 195 39 012 A1 | 4/1997 |
| DE | 199 31 228 A1 | 1/2001 |
| DE | 199 57 939 A1 | 5/2001 |
| EP | 0 953 785 A2 | 11/1999 |

* cited by examiner

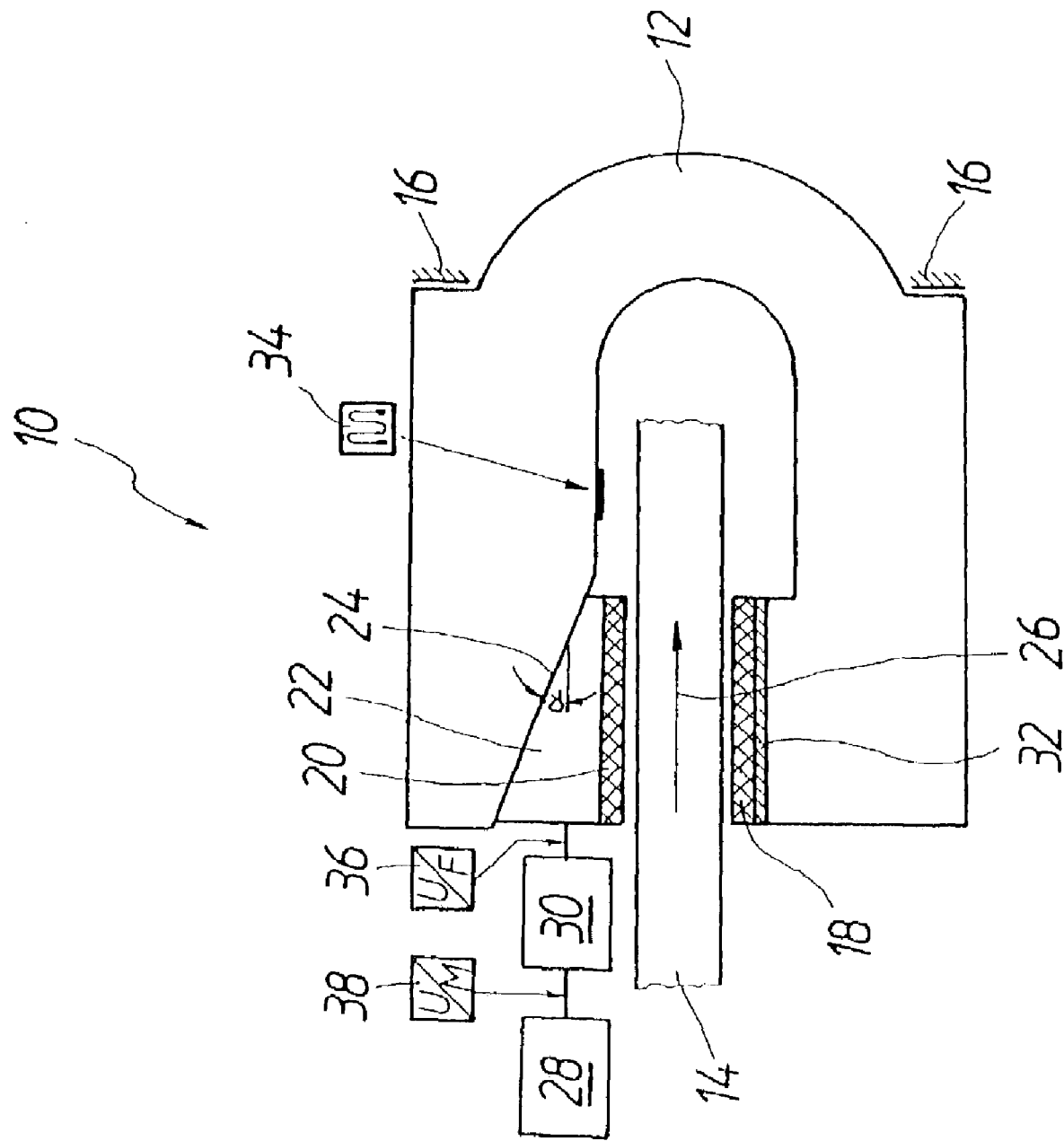

SELF-BOOSTING FRICTION BRAKE, DEVICE FOR MEASURING THE COEFFICIENT OF FRICTION, AND METHOD FOR REGULATING A BRAKING FORCE

BACKGROUND OF THE INVENTION

1. Field of the Invention

The invention relates to a self-boosting friction brake, in particular for automobiles. The invention also relates to a apparatus for measuring the coefficient of friction for a friction brake and to a method for regulating a braking force.

2. Description of the Prior Art

One example of self-boosting friction brakes is drum brakes with one or more primary brake shoes. This example is meant to make it clear that the discussion that follows is not limited to disk brakes, although the discussion is directed to disk brakes, which are preferred according to the invention. To attain self-boosting in disk brakes, actuating devices are used that have a wedge mechanism, lever mechanism, or ramp mechanism. At least in theory, an analogy can be made between a lever mechanism and the primary brake shoe of a drum brake.

Known self-boosting disk brakes have a friction brake lining, which to generate a braking force can be pressed with a contact-pressure element against a rotatable brake body; in the case of a disk brake, the brake body is a brake disk. The contact-pressure element is for instance a wedge element, which is movable in a direction of rotation of the brake body and is braced on a buttress at a support angle to a normal of the brake body. The support angle, in the case where a wedge element is used as the contact-pressure element, is its wedge angle; if a lever is used, it is the angle at which the lever is oriented to a normal of the brake body. If a ramp mechanism is used, the buttress is a face or guide (ramp) extending obliquely to the brake disk, and the angle at which the buttress extends relative to the brake body is the support angle. If a ramp mechanism is used, the contact-pressure element can be a wedge element; that is, wedge and ramp mechanisms do not preclude one another. The support angle of the ramp can be constant or can vary over a length of the ramp. In the case of a lever, the support angle changes upon actuation of the brake.

To attain self-boosting, the contact-pressure element is disposed such that when the brake is actuated, a frictional force exerted on the friction brake lining by the rotating brake body urges the contact-pressure element in the direction of an increasingly strong contact pressure exerted on the friction brake lining by the contact-pressure element. This means that a wedge element as the contact-pressure element is moved into a narrower and narrower wedge gap between the buttress and the brake body. A lever as a contact-pressure element is urged in the direction of a smaller and smaller support angle to the normal of the brake body; that is, the lever is disposed in the form of a so-called pushed lever or lever subjected to compressive stress.

Known friction brakes have an actuating device, with which for actuation the contact-pressure element is movable in the direction of rotation of the brake body, while for releasing the brake it is movable counter to the direction of rotation of the brake body. As a result of the motion in the direction of rotation of the brake body, the contact-pressure element braced on the buttress moves toward the brake body and presses the friction brake lining against the brake body.

One example of this kind of self-boosting friction brake is disclosed in European Patent Disclosure EP 953 785. This friction brake is embodied as a full disk brake and has a number of wedge elements, which are disposed on a circular-annular disk and are braced on rollers as buttresses. By rotation of the circular-annular disk, the wedge elements are moved in the direction of rotation of the brake disk and press a number of friction brake linings against the brake disk. By reverse rotation of the circular-annular disk, the known disk brake is released.

In all the known self-boosting friction brakes, the support angle or wedge angle is selected to be large enough that self-locking of the brake is precluded with certainty. In self-locking, blocking of the brake body occurs because of the frictional force exerted on the contact-pressure element by the rotating brake body when the brake is actuated; this frictional force displaces the contact-pressure element in the direction of an increasingly strong contact pressure. The contact pressure of the friction brake lining against the brake body is increased, without increasing the actuating force with which the contact-pressure element is urged in the direction of rotation of the brake body. The contact pressure increases on its own, until self-locking ensues; that is, the brake body blocks. Since a coefficient of friction between the friction brake lining and the brake body changes as a result of such interfering factors as soiling, moisture, water, temperature, and contact pressure, a sufficiently large support angle must be selected to preclude self-locking of the brake with certainty under all possible operating conditions. However, as a result the magnitude of the self-boosting is limited, and despite the self-boosting, a strong actuating force is required. This necessitates a sufficiently powerfully dimensioned actuating device, which in turn leads to high weight and high inertia of masses in motion of the actuating device, with correspondingly worse dynamics. High actuating energy is also required.

Self-locking must always be expected if the so-called brake parameter C* undergoes a change of sign, i.e. from positive to negative or vice versa. The brake parameter is the ratio between the circumferential force generated at a brake body and the associated actuating force of the friction brake. At the point where the change of sign occurs, the brake parameter C* has a pole (or so-called pole point), and at this point the self-boosting of the friction brake tends toward infinity. For the friction brakes under consideration here, the brake parameter C* is affected not only by the support angle $\alpha$ but essentially by the coefficient of friction $\mu$ between the friction brake lining and the brake body. For the pole point, the applicable equation is $\mu = \tan \alpha$. For $\mu < \tan \alpha$, the contact-pressure element must be acted upon by an actuating force to generate a braking action. For $\mu > \tan \alpha$, the contact-pressure element is slaved by the rotating brake body as a result of friction, without any actuating force being exerted. This can lead to self-locking of the brake.

OBJECT AND SUMMARY OF THE INVENTION

In the friction brake of the invention the support angle of the contact-pressure element is selected such that the brake parameter is at or near the pole point; that is, the self-boosting of the friction brake tends toward infinity or in any case is quite high. Since the coefficient of friction between the friction brake lining and the brake body varies as a function of the operating conditions, at a predetermined support angle it is not fixedly known in advance whether the brake parameter is located at the pole point or near it. The invention accordingly seeks to select the support angle such that the self-boosting is quite high and can tend toward infinity as a function of the operating conditions. Since the coefficient of friction varies with the operating conditions, the support angle of the invention cannot be exactly defined. However, the friction brake of the invention preferably has a fixed, nonadjustable support angle.

To prevent self-locking, the actuating device of the friction brake of the invention is embodied as blocking an independent motion of the contact-pressure element in and counter to the direction of rotation of the brake body. This means that when the brake is actuated, the frictional force exerted on the friction brake lining by the rotating brake body either does not move the contact-pressure element onward, or moves it onward in the direction of rotation of the brake body only in a way that is limited to a play of the actuating device. One example for a blocking actuating device is a helical gear, such as a spindle drive. If the actuating device is assumed to be without play, then even if the self-locking tends toward infinity or if there is a change of sign of the brake parameter, a contact pressure and hence a braking force upon actuation of the friction brake do not increase, since the contact-pressure element is not moved with it in the direction of rotation of the brake body and consequently is not moved toward the brake body either, which would be the prerequisite for an increase in the contact pressure of the friction brake lining at the brake body. If the actuating device does have play, then upon a change of sign of the brake parameter, the contact-pressure element moves in the direction of rotation along with the brake body in a way limited to the play of the actuating device. An increase in the contact pressure and the braking force is limited as a result of the limited travel of the contact-pressure element in the direction of rotation of the brake body. In that case, although the braking force does increase, nevertheless no self-locking and hence no blocking of the brake body occurs, unless the braking force is already just below a blocking limit of the brake body.

If a limited stiffness of the friction brake is additionally taken into account, for instance a widening of a caliper of a disk brake as a result of the contact pressure, then the increase in the braking force that occurs from play in the actuating device weakens upon a change of sign of the brake parameter, since the buttress moves away from the brake body upon a motion of the contact-pressure element because of the elasticity of the friction brake. This acts counter to a degree of the increase in the contact pressure and thus a degree of the increase in the braking force. Because of what in practice is an unavoidable elasticity even if the friction brake is embodied as stiff, a spacing between the buttress and the brake body increases as a result of the contact pressure of the friction brake lining against the brake body upon brake actuation.

Another possible way of preventing self-locking of the friction brake is an (electronic) regulation of the contact pressure of the friction brake lining against the brake body. For example, a displacement travel of the contact-pressure element can be regulated. The regulating device counteracts an independent motion of the contact-pressure element from the frictional force exerted on the contact-pressure element by the brake body. The regulating device controls or regulates the actuating device that moves the contact-pressure element.

The invention is based on the recognition that in a self-boosting friction brake, when a change of sign in the brake parameter occurs, the braking force does not increase arbitrarily and block the brake body, on the condition that the travel of the contact-pressure element in the direction of rotation of the brake body is limited. The travel limitation is attainable for instance by means of a blocking actuating device, or by a regulation of the travel of the contact-pressure element or of the contact pressure. The invention is also based on the recognition that a braking force increase, to be expected upon the occurrence of a change of sign of the brake parameter, is in practice not significant, since the dynamics of available actuating devices (actuators) are markedly greater than the inertia of the mechanical system for the self-boosting. These recognitions run counter to the firm opinion in the profession, developed over decades, that a self-boosting friction brake must be constructed in such a way that a change of sign in the brake parameter during braking must be avoided with certainty under all operating conditions.

In conventional use, changes in the coefficient of friction between the friction brake lining and the brake body, which in rapid succession cause overshooting and undershooting of the pole point of the brake parameter, are not expected. Even under such conditions, however, the friction brake of the invention functions well; significant fluctuations in braking force that are problematic in everyday use do not occur.

The friction brake of the invention has the advantage of requiring only a slight actuating or releasing force, since it operates at very high brake parameters and therefore a large part of the contact pressure of the friction brake lining against the brake body that is required to bring about a braking force is brought to bear as a result of the self-boosting. The friction brake of the invention has very high self-boosting, which in the limit case tends toward infinity. Depending on operating conditions, the friction brake of the invention operates below, at, or above the pole point of the brake parameter where the change of sign in the brake parameter occurs and the self-boosting tends toward infinity. The actuating device can as a result be embodied as comparatively small and light in weight, yet its dynamics are high because of low moments of inertia. The energy of actuation is furthermore slight. The friction brake of the invention is therefore suitable for electromechanical actuation with an electric motor in accordance with claim 9. Precisely in electromechanical friction brakes, a self-boosting embodiment has advantages in terms of weight, structural size, and dynamics.

By using two electric motors, redundancy can be achieved. Moreover, if a spindle drive with two electric motors is for instance used, freedom of play is achieved by providing that two nuts and/or two spindles of the spindle drive are prestressed against one another by the two electric motors.

An apparatus for measuring the coefficient of friction for a friction brake is disclosed. The apparatus for measuring the coefficient of friction of the invention has a device for measuring a contact pressure of the friction brake lining against the brake body and a device for measuring an actuating force of the friction brake. The two measuring devices can for instance be load cells or other force sensors. The negative quotient of the two variables measured, plus the tangent of the support angle, is the coefficient of friction between the friction brake lining and the brake body ($\mu=-F_{app}/F_N+\tan\infty$, in which $F_{app}$ is the actuating force and $F_N$ is the contact pressure; $\tan\infty$, for a fixed support angle, is a constant variable). The apparatus for measuring the coefficient of friction of the invention has the advantage that regulating the braking force of the friction brake is possible despite the coefficient of friction that varies as a result of interfering factors. In known friction brakes, at most the actuating force or the contact pressure of the friction brake lining against the brake body is regulated. Since the coefficient of friction varies, a constant braking force is not attained by means of that kind of regulation.

Instead of measuring the contact pressure of the friction brake lining against the brake body or the actuating force, variables proportional to these forces can also be measured, since for regulating the braking force it is not compulsory that the coefficient of friction be ascertained; a value proportional to the coefficient of friction suffices. For instance, the force prevailing at the buttress of the contact-pressure element, or a widening of a caliper of a disk brake, that is, a deformation of the friction brake that is characteristic for the contact pressure, is proportional to the contact pressure of the friction brake lining against the brake body. Instead of the actuating force, a torque or a current consumption of an electric motor of the actuating device can for instance be measured.

A guide variable may be multiplied by the coefficient of friction or by a value proportional to the coefficient of friction as a correction factor. The coefficient of friction can be ascertained in the way described above. The guide variable can for instance be a contact pressure of the friction brake lining against the brake body or the actuating force. The value of the guide variable is determined for instance as a function of a distance by which a brake pedal is depressed, or as a function of a force with which the brake pedal is depressed; this dependency need not be proportional. As a result of the multiplication by the coefficient of friction, or a value proportional to it, variations in the coefficient of friction are eliminated, and the braking force of the friction brake is regulated to a value that is dependent on the pedal actuation but independent of the coefficient of friction.

BRIEF DESCRIPTION OF THE DRAWING

The invention will be better understood and further objects and advantages thereof will become more apparent from the ensuing detailed description of a preferred embodiment taken in conjunction with the drawing, in which the sole FIGURE of the drawing schematically shows an exemplary embodiment of a self-boosting friction brake according to the invention.

DESCRIPTION OF THE PREFERRED EMBODIMENT

The self-boosting friction brake 10 of the invention, shown in the drawing, is embodied as a disk brake. The disk brake has a caliper 12, embodied as a so-called floating caliper; that is, the caliper 12 is displaceable transversely to a brake disk 14. The transverse displaceability of the caliper 12 is indicated in the drawing by buttresses 16 represented as symbols.

One fixed friction brake lining 18, on one side of the brake disk 14, and one movable friction brake lining 20, on the opposite side of the brake disk 14, are disposed in the caliper 12. For generating a braking force, the movable friction brake lining 20 can be pressed against the one side of the brake disk 14 by a wedge mechanism to be explained hereinafter. As a result of the contact pressure of the movable friction brake lining 20 against the brake disk 14, the caliper 12 is displaced, in a manner known per se, transversely to the brake disk 14 and presses the fixed friction brake lining 18 against the opposite side of the brake disk 14; the brake disk 14 is braked.

For pressing the movable friction brake lining 20 against the brake disk 14, the friction brake 10 has a wedge element 22, which is displaceable parallel to the brake disk 14 and is disposed on a back side, remote from the brake disk 14, of the movable friction brake lining 20 and is braced displaceably, at a wedge angle α, on an oblique face or ramp of the caliper 12. The oblique face or ramp forms a buttress 24 for the wedge element 22, which is disposed at the wedge angle α to the brake disk 14. The wedge angle α can also be called the support angle α. The wedge element 22 and the buttress 24 are disposed such that an interstice, or wedge gap, between the buttress 24 and the brake disk 14 narrows in a direction of rotation 26 of the brake disk 14. By displacement of the wedge element 22 in the direction of rotation 26 of the brake disk, the movable friction brake lining 20 is pressed against the brake disk 14. Via the caliper 12, in the manner described above, the fixed friction brake lining 18 is pressed against the opposite side of the brake disk 14, and the brake disk 14 is braked. For releasing the friction brake 10, the wedge element 22 is displaced in the opposite direction, that is, in the direction of widening of the wedge gap.

The friction brake 10 is actuatable electromechanically; it has an actuating device which has an electric motor 28 and a rotation/translation conversion gear 30. A step-down gear, not shown separately in the drawing, can be disposed between the electric motor 28 and the rotation/translation conversion gear 30. The rotation/translation conversion gear 30 has a helical gear, for instance a spindle drive, and for the sake of simplicity will hereinafter be called the spindle drive 30. By being driven to rotate by the electric motor 28, the spindle drive 30 displaces the wedge element 22 parallel to the brake disk 14, specifically as a function of the direction of rotation of the electric motor 28 in or counter to the direction of rotation 26 of the brake disk 14. An electronic regulating device, not shown, is provided, which regulates the displacement travel of the wedge element 22 to a set-point value. The regulating device prevents an independent motion of the wedge element 22 as a result of the frictional force exerted by the brake disk 14 on the friction brake lining 20. The regulating device compensates for any play there may be in the spindle drive 30.

As a result of the wedge element 22 which is displaceable in the direction of rotation 26 of the brake disk 14, the friction brake 10 has self-boosting: When the friction brake 10 has been actuated, the rotating brake disk 14 exerts a frictional force in the direction of rotation 26 on the movable friction brake lining 20 pressed against the brake disk 14. This frictional force is transmitted to the wedge element 22. The frictional force acts in the direction of the increasingly narrower wedge gap and, because of the bracing of the wedge element 22 on the buttress 24, effects an increase in the contact pressure of the friction brake lining 20 against the brake disk 14. The wedge angle α is selected according to the invention such that a brake parameter C* of the friction brake 10 is located at or near a pole point. The brake parameter C* is the ratio between a frictional force, exerted on the brake disk 14 by the friction brake lining 20 pressed against the brake disk 14, and an actuating force, that is, the force exerted on the wedge element 22 by the spindle drive 30. At the pole point of the brake parameter C*, the self-boosting of the friction brake 10 tends toward infinity. As a result of the wedge angle α of the invention, a change of sign of the brake parameter C* can occur as fluctuations, which are to be expected, in the coefficient of friction between the friction brake lining 20 and the brake disk 14. To prevent blocking of the brake disk 14 when the self-boosting is tending toward infinity, the regulating device is provided, which prevents an independent motion of the wedge element 22 and thus an unwanted change in braking force. Instead of or in addition to the regulating device, the spindle drive 30 can be embodied as blocking an independent motion of the wedge element 22.

The wedge angle α is selected to be a value for which the brake parameter C* is substantially at a pole point. For instance, the wedge angle α is selected such that when the brake disk 14 is dry and free of dirt and at a mean contact pressure of the friction brake lining 20 against the brake disk 14, the brake parameter C* is still just barely positive. The wedge element 22 must be forced into the wedge gap by the spindle drive. If the friction between the brake disk 14 and the friction brake lining 20 increases, then a change of sign in the brake parameter C* occurs, and the wedge element 22 must be restrained by the spindle drive 30 from being drawn into the wedge gap as a result of friction. This choice of the wedge angle a has the advantage that only a slight actuating force is required to displace the wedge element 22 for actuating the friction brake 10, since a large part or the greatest part of the contact pressure of the friction brake lining 20 against the brake disk 14 is effected by the self-boosting of the friction brake 10.

If the spindle drive 30 is assumed to be without play, then the wedge element 22, when a change of sign in the brake parameter C* occurs, does not move farther into the ever-narrower wedge gap, and the contact pressure of the friction brake lining 20 against the brake disk 14 and thus the braking force become greater only by the factor by which the coefficient of friction changes, the change in which causes the change of sign of the brake parameter C*. If the spindle drive 30 does have play, then the braking force increases to a limited extent corresponding to the displacement of the wedge element 22 as a result of the play of the spindle drive 30. The increase in braking force is limited, and self-locking of the brake disk 14 does not ensue. With a regulating device, the increase in braking force caused by play can be reduced.

The increase or decrease in the braking force upon the occurrence of a change of sign in the brake parameter C*, in the case of a spindle drive 30 that has play, is all the slighter, the greater the elasticity of the caliper 12: Since in practice the caliper 12 is indeed stiff but need not be embodied as absolutely rigid, it widens in response to the contact pressure of the friction brake linings 18, 20 against the brake disk 14. If upon a change of sign in the brake parameter C* the contact pressure of the movable friction brake lining 20 increases as a result of a displacement of the wedge element 22 by the amount of the play of the spindle drive 30, then the caliper 12 widens. As a consequence, an increase in the contact pressure and thus also an increase in the braking force are substantially less than if the caliper 12 were rigid or very stiff. The increase in braking force upon a change of sign in the brake parameter C* caused by the play of the spindle drive 30 is accordingly weakened because of the still-present elasticity of the caliper 12. The limited stiffness or elasticity of the caliper 12 is meant to be represented in the drawing by the caliper 12 shown in the form of a U-shaped hoop. It is understood that in its practical form, the caliper 12 of the friction brake 10 can be conventional in shape and embodiment. The invention is based in particular on the recognition that fluctuations in braking force upon the occurrence of a change of sign of the brake parameter C*, even if the spindle drive 30 has play, are so slight that they are acceptable in practical operation, and that therefore a wedge angle α at or near the pole point of the brake parameter C* can be selected. Even if multiple rapid changes of sign in the brake parameter C* occur during a braking event, the attendant changes in braking force are insignificant and acceptable, particularly because of using the regulating device for the displacement travel of the wedge element 22 or of using the contact pressure.

To keep such fluctuations in braking force slight, the spindle drive 30 or in general a rotation/translation conversion gear is embodied with little play or ideally without play. An embodiment without play is possible for instance by means of two spindles and/or nuts of the spindle drive 30 that are prestressed axially counter to one another.

The friction brake 10 has an apparatus for measuring the coefficient of friction: The apparatus for measuring the coefficient of friction includes a device 32 for measuring the contact pressure of the friction brake linings 18, 20 against the brake disk 14. This device can for instance be a piezoelectric element, which for instance is disposed as shown between the fixed friction brake lining 18 and the caliper 12. It is understood that the piezoelectric element can instead be disposed (in a manner not shown) between the movable friction brake lining 20 and the wedge element 22. Instead of the contact pressure, a variable proportional to the contact pressure, such as the bracing force of the wedge element 22 on the buttress 24, or the widening of the caliper 12, can for instance be measured. Measuring the widening is represented in the drawing by a strain gauge 34.

The apparatus for measuring the coefficient of friction furthermore includes a device for measuring the actuating force with which the wedge element 22 is urged parallel to the brake disk 14. This can be done for instance by means of a force sensor 36. Here again, instead of the actuating force, a variable proportional to it, such as the torque exerted by the electric motor 28, can be measured with the torque sensor 38, or a current consumption of the electric motor 28 can be measured. From the ratio between the actuating force and the contact pressure, the coefficient of friction between the friction brake lining 20 and the brake disk 14, and thus the braking force of the friction brake 10 as well, can be ascertained. This makes it possible to regulate the friction brake 10 to the braking force actually generated, for example as a function of a brake pedal position, or as a function of a force with which a brake pedal is depressed. Since for regulating the braking force its absolute value need not be ascertained, but instead, it suffices to regulate a variable proportional to the braking force, the contact pressure of the friction brake linings 18, 20 against the brake disk 14 and the actuating force exerted on the wedge element 22 need not be measured in order to regulate the braking force; instead, it suffices to measure variables proportional to these two forces.

The friction brake 10 shown in the drawing has self-boosting only in the direction of rotation 26 shown for the brake disk 14. To attain self-boosting for a brake disk 14 rotating in the opposite direction, it is possible for instance, besides a second friction brake disposed in the opposite direction, to provide a double wedge instead of the wedge element 22, which double wedge, depending on the direction of rotation of the brake disk 14, is braced on one of two opposed oblique buttresses, or else two wedge elements each with an associated buttress can be provided.

To achieve redundance, the friction brake 10 can have two electric motors 28, which drive the spindle drive 30 for instance via a differential gear, such as a planetary gear (not shown). With two electric motors, it is also possible for two nuts, for instance, which are mounted on a spindle of a spindle drive, to be axially prestressed counter to one another, in order to eliminate play.

The foregoing relates to a preferred exemplary embodiment of the invention, it being understood that other variants and embodiments thereof are possible within the spirit and scope of the invention, the latter being defined by the appended claims.

We claim:

1. A self-boosting friction brake, having a friction brake lining, having a contact-pressure element with which the friction brake lining, for generating a braking force, can be pressed against a rotatable brake body, the contact-pressure element being movable in a direction of rotation of the rotatable brake body and being braced on a buttress at a support angle to a normal of the rotatable brake body, and when the friction brake is actuated the rotatable brake body exerts a frictional force on the friction brake lining that urges the contact-pressure element in the direction of an increasingly strong contact pressure, and having an actuating device with which the contact-pressure element is movable in and counter to the direction of rotation of the rotatable brake body, characterized in that the support angle (α) is selected such that a brake parameter C* of the friction brake (10) is located substantially at a pole point.

2. The self-boosting friction brake of claim 1, characterized in that the actuating device (28, 30) is embodied as blocking an independent motion of the contact-pressure element (22) in and counter to the direction of rotation (26) of the brake body (14).

3. The self-boosting friction brake of claim 1, characterized in that the friction brake (10) has a regulating device for regulating the contact pressure of the friction brake lining (20) against the brake body (14).

4. The self-boosting friction brake of claim 1, characterized in that the friction brake (10) is a disk brake.

5. The self-boosting friction brake of claim 1, characterized in that the contact-pressure element is a wedge element (22).

6. The self-boosting friction brake of claim 1, characterized in that the buttress (24) has an oblique guide (ramp), relative to the brake body (14), for the contact-pressure element (22).

7. The self-boosting friction brake of claim 1, characterized in that the actuating device (28, 30) has a helical gear.

8. The self-boosting friction brake of claim 1, characterized in that the actuating device (28, 30) is embodied without play.

9. The self-boosting friction brake of claim 1, characterized in that the actuating device has an electric motor (28).

10. The self-boosting friction brake of claim 9, characterized in that the actuating device (28, 30) has two electric motors (28).

11. A self-boosting friction brake, having a friction brake lining, having a contact-pressure element with which the friction brake lining, for generating a braking force, can be pressed against a rotatable brake body, the contact-pressure element being movable in a direction of rotation of the rotatable brake body and being braced on a buttress at a support angle (α) to a normal of the rotatable brake body, and when the friction brake is actuated the rotatable brake body exerts a frictional force on the friction brake lining that urges the contact-pressure element in the direction of an increasingly strong contact pressure, and having an actuating device which alternatively moves the contact-pressure element in the direction of rotation of the rotatable brake body, or counter to the direction of rotation of the rotatable brake body, characterized in that the support angle (α) is selected such that a brake parameter C* of the friction brake is located sufficiently close to a pole point so that normal, expected variations in the coefficient of friction of the friction brake lining with respect to the brake body can cause the brake parameter C* to cross the pole point.

12. The self-boosting friction brake of claim 11, characterized in that the actuating device (28, 30) is embodied as blocking an independent motion of the contact-pressure element (22) in and counter to the direction of rotation (26) of the brake body (14).

13. The self-boosting friction brake of claim 11, characterized in that the friction brake (10) has a regulating device for regulating the contact pressure of the friction brake lining (20) against the brake body (14).

14. The self-boosting friction brake of claim 11, characterized in that the friction brake (10) is a disk brake.

15. The self-boosting friction brake of claim 11, characterized in that the contact-pressure element is a wedge element (22).

16. The self-boosting friction brake of claim 11, characterized in that the buttress (24) has an oblique guide (ramp), relative to the brake body (14), for the contact-pressure element (22).

17. The self-boosting friction brake of claim 11, characterized in that the actuating device (28, 30) has a helical gear.

18. The self-boosting friction brake of claim 11, characterized in that the actuating device (28, 30) is embodied without play.

19. The self-boosting friction brake of claim 11, characterized in that the actuating device has an electric motor (28).

20. The self-boosting friction brake of claim 19, characterized in that the actuating device (28, 30) has two electric motors (28).

* * * * *